(12) United States Patent
Hassell et al.

(10) Patent No.: US 9,668,594 B2
(45) Date of Patent: Jun. 6, 2017

(54) MULTI-POSITION TRAY SUPPORT

(71) Applicant: Rehrig Pacific Company, Los Angeles, CA (US)

(72) Inventors: Jon P. Hassell, Atlanta, GA (US); Derick Foster, Cumming, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 14/870,903

(22) Filed: Sep. 30, 2015

(65) Prior Publication Data
US 2016/0088956 A1 Mar. 31, 2016

Related U.S. Application Data

(60) Provisional application No. 62/057,866, filed on Sep. 30, 2014.

(51) Int. Cl.
*A47B 13/08* (2006.01)
*A47F 10/02* (2006.01)
*F16M 13/02* (2006.01)
*A47F 5/12* (2006.01)
*A47J 37/01* (2006.01)

(52) U.S. Cl.
CPC ............... *A47F 10/02* (2013.01); *A47F 5/12* (2013.01); *A47J 37/01* (2013.01); *F16M 13/02* (2013.01)

(58) Field of Classification Search
CPC .. A47F 10/02; A47F 5/12; A47J 37/01; F16M 13/02

USPC ....... 108/26, 60, 61; 312/408; 211/184, 175, 211/83, 59.3, 43, 11

See application file for complete search history.

(56) References Cited

U.S. PATENT DOCUMENTS

| | | | | | |
|---|---|---|---|---|---|
| 3,094,948 | A | * | 6/1963 | Clow | A47B 9/16 108/10 |
| 3,388,808 | A | * | 6/1968 | Radek | A47F 5/0031 211/132.1 |
| 3,625,371 | A | * | 12/1971 | Dill | A47B 96/025 108/90 |
| 4,089,574 | A | * | 5/1978 | Ford | B65D 61/00 312/108 |
| 4,437,572 | A | * | 3/1984 | Hoffman | A47F 5/13 108/60 |
| 4,500,147 | A | * | 2/1985 | Reister | F25D 23/025 312/291 |
| 4,610,491 | A | * | 9/1986 | Freeman | F25D 25/02 312/291 |
| 6,390,310 | B1 | * | 5/2002 | Insalaco | A47B 96/02 211/134 |

(Continued)

*Primary Examiner* — Jose V Chen
(74) *Attorney, Agent, or Firm* — Carlson, Gaskey & Olds PC

(57) ABSTRACT

A tray support device includes a base and a front face extending upward from a front edge of the base. At least one support member is movable from a collapsed position on the base to a deployed position spaced above the base. At least one prop may be selectively positionable relative to the base and the support member to move the at least one support member between the collapsed position and the deployed position. A tray is supported on the at least one support member and abuts the front face. In the deployed position, the support member holds the tray at a forward angle, to facilitate access to the goods in the tray by customers.

11 Claims, 5 Drawing Sheets

(56) References Cited

U.S. PATENT DOCUMENTS

| | | | | |
|---|---|---|---|---|
| 6,651,828 B2 * | 11/2003 | Dimattio | ................ | A47F 5/005 |
| | | | | 108/60 |
| 7,198,160 B2 * | 4/2007 | Ernst | ........................ | A47F 5/01 |
| | | | | 211/126.8 |
| 7,198,340 B1 * | 4/2007 | Ertz | ....................... | F25D 25/02 |
| | | | | 211/119.003 |
| 7,357,469 B2 * | 4/2008 | Ertz | ....................... | F25D 25/02 |
| | | | | 211/119.003 |
| D700,779 S * | 3/2014 | Noll | ............................. | D3/304 |
| 9,173,504 B2 * | 11/2015 | Hardy | ..................... | A47F 1/126 |
| 2010/0307998 A1 * | 12/2010 | Chen | ..................... | A47F 5/0043 |
| | | | | 211/184 |

\* cited by examiner

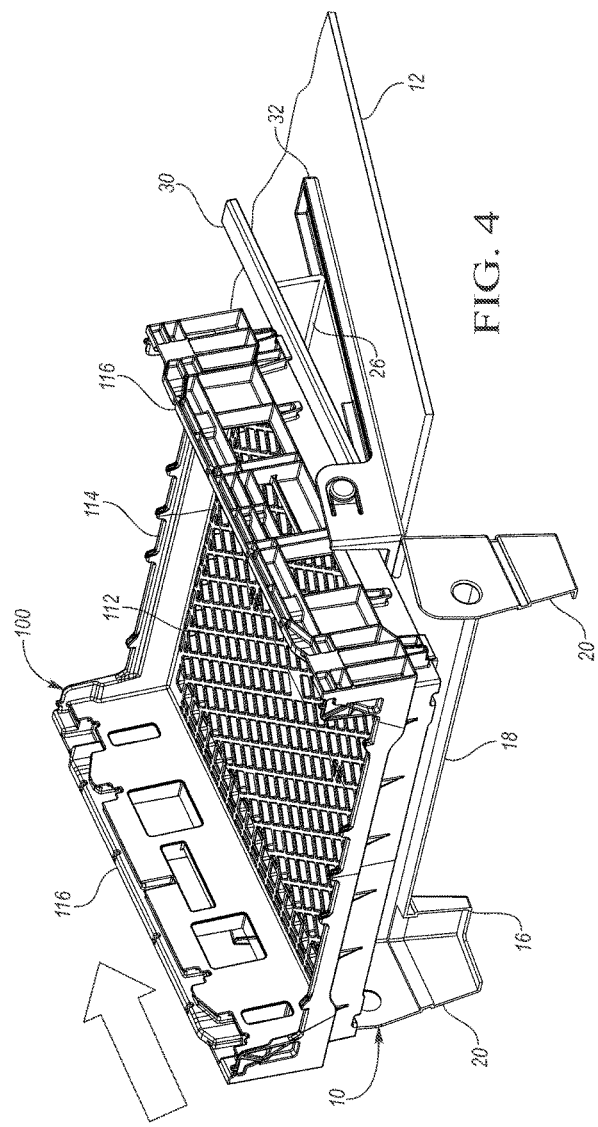

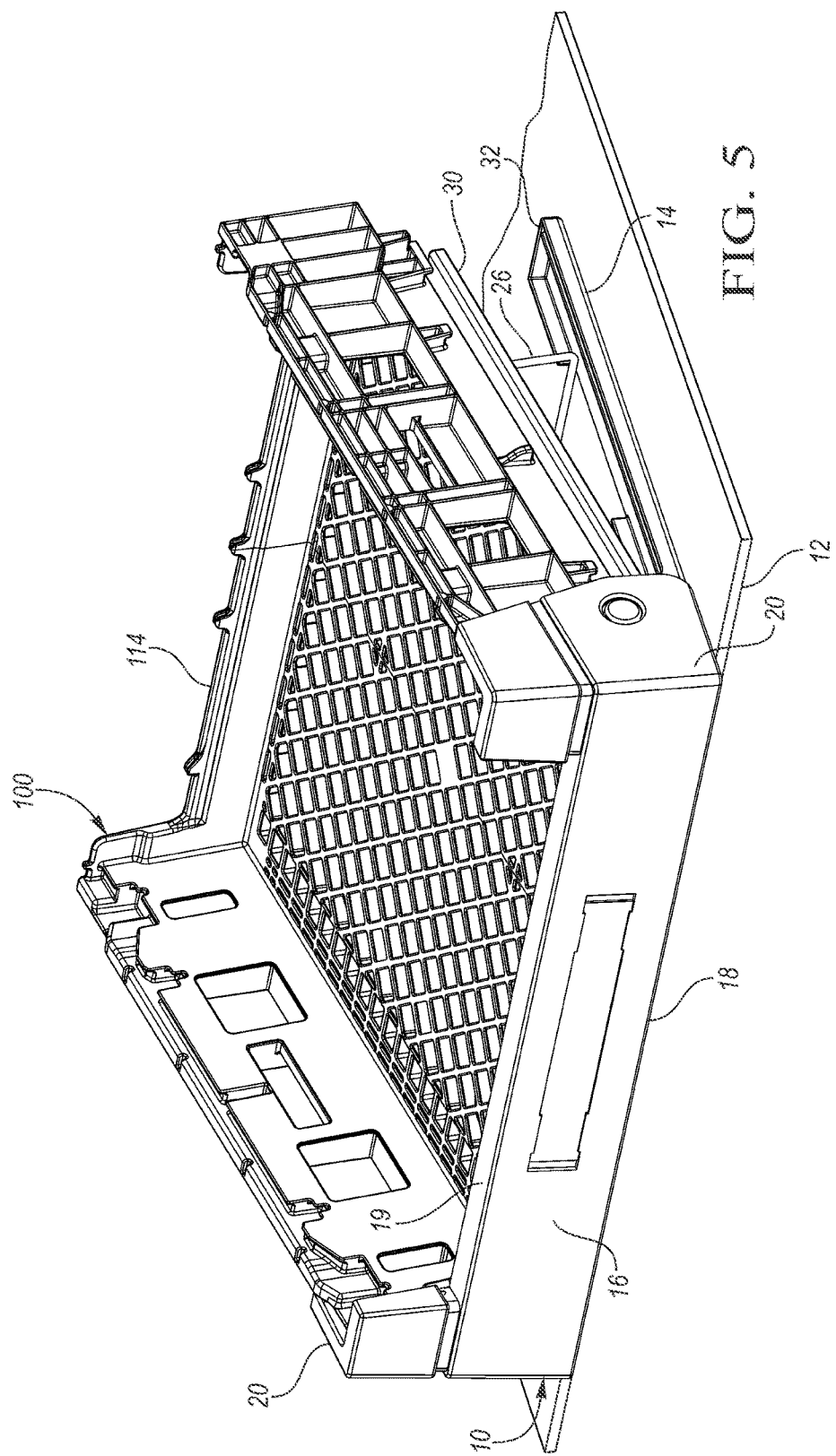

MULTI-POSITION TRAY SUPPORT

BACKGROUND

Many grocery store goods, such as baked goods, are shipped in bakery trays. The bakery trays each include a base, opposing side walls and opposing front and rear walls. The front and rear walls are usually shorter than the side walls to facilitate access to the goods in the tray. At the store, the goods are often removed from the trays and placed on a shelf for selection by the customers. Moving the goods to the shelves requires additional effort and expense.

SUMMARY

A tray support device includes a base and a front face extending upward from a front edge of the base. At least one support member is movable from a collapsed position on the base to a deployed position spaced above the base. At least one prop may be selectively positionable relative to the base and the support member to move the at least one support member between the collapsed position and the deployed position.

The front face may be pivotable from an upright position to a retracted position. For example, the front face may be hingeably connected to the base.

The tray support device may include side flanges extending rearward from side edges of the front face and formed integrally with the front face.

The tray support device may include base flanges extending upward from the base so that they can be selectively secured to the side flanges of the front face to lock the front face in the upright position.

In use, the base of the tray support device may be installed or simply placed on a shelf, such as a grocery store shelf. A tray loaded with goods, such as a bakery tray loaded with baked goods, such as bread, can be placed in the tray support device without having to unload the goods one at a time onto the shelf. The tray is supported on the at least one support member and abuts the front face. In the deployed position, the support member holds the tray at a forward angle, to facilitate access to the goods in the tray by customers.

BRIEF DESCRIPTION OF THE DRAWINGS

FIG. 4 shows the tray support device of FIG. 3 with a bakery tray being loaded thereon.

FIG. 5 shows the tray support device of FIG. 4 with the bakery tray loaded on the tray support device and the front face closed.

DETAILED DESCRIPTION OF A PREFERRED EMBODIMENT

Figure 1:
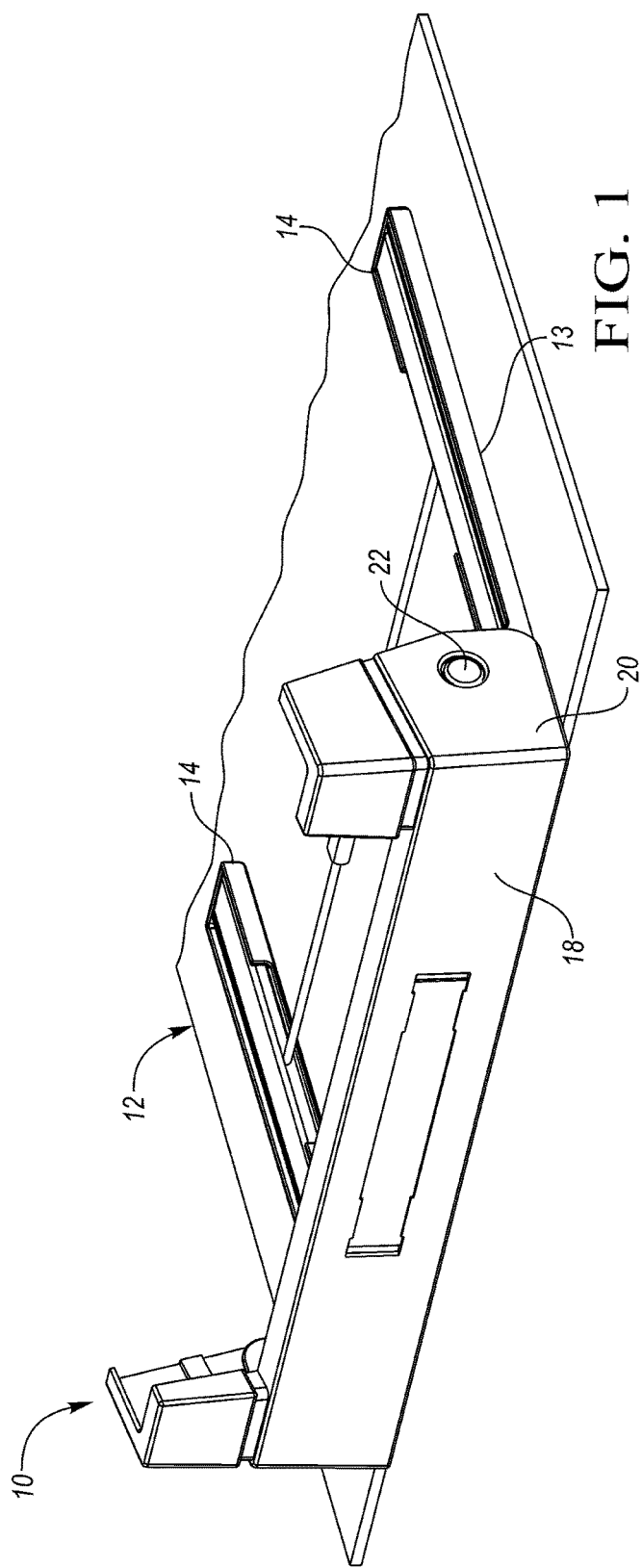
FIG. 1 is a perspective view of a tray support device according to one embodiment.

FIG. 1 shows a tray support 10 installed on a shelf 12, which could be a grocery store shelf 12. The tray support 10 includes a base 13 which may include a pair of generally parallel base arms 14 supported on (and optionally secured to) the shelf 12. The tray support 10 further includes a front face 16 which includes a front wall 18 and side flanges 20 extending rearward from side edges of the front wall 18. Release buttons 22 on each side flange 20 permit a user to selectively release the front face 16, such that it can be pivoted downward as shown in FIG. 2.

Figure 2:
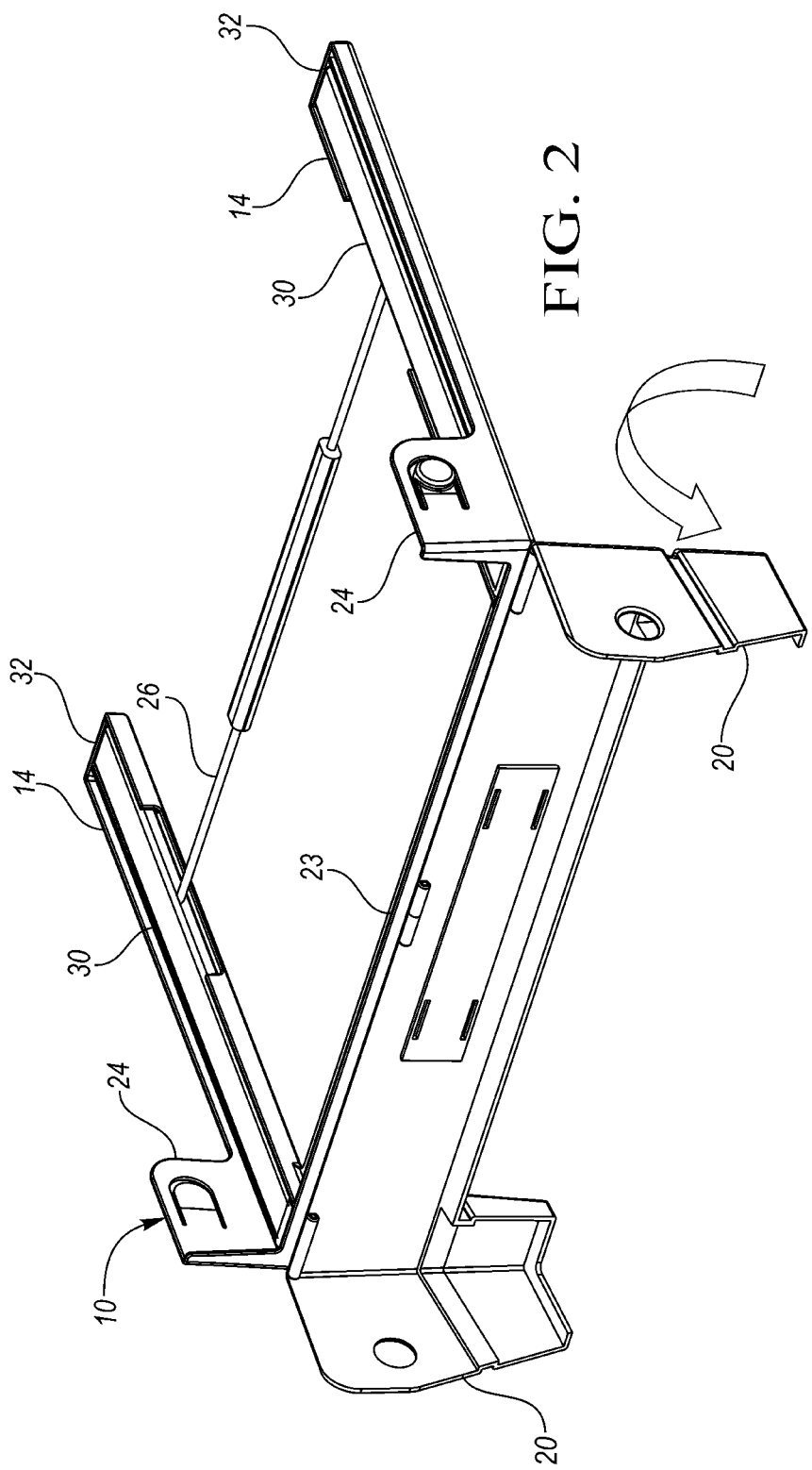
FIG. 2 shows the tray support device of FIG. 1 with the front face pivoted downward to a retracted position.

In FIG. 2, the front face 16 is pivoted downward to an "open position." A front ledge 19 projects inward from the upper edge of the center portion of the front face 16. The front face is hingeably connected to a front base portion 23 of the base 13. The front base portion 23 connects front ends of the base arms 14. Base flanges 24 project upward proximate front ends of the base arms 14. The base flanges 24 selectively secure to the side flanges 20 of the front face 16, when the front face 16 is in an upright, closed position (FIG. 1) and can be released by pressing the buttons 22. A generally U-shaped prop bar 26 extends from one base arm 14 to the other. Each base arm 14 includes an upper support member 30 and a lower base arm 32.

Figure 3:
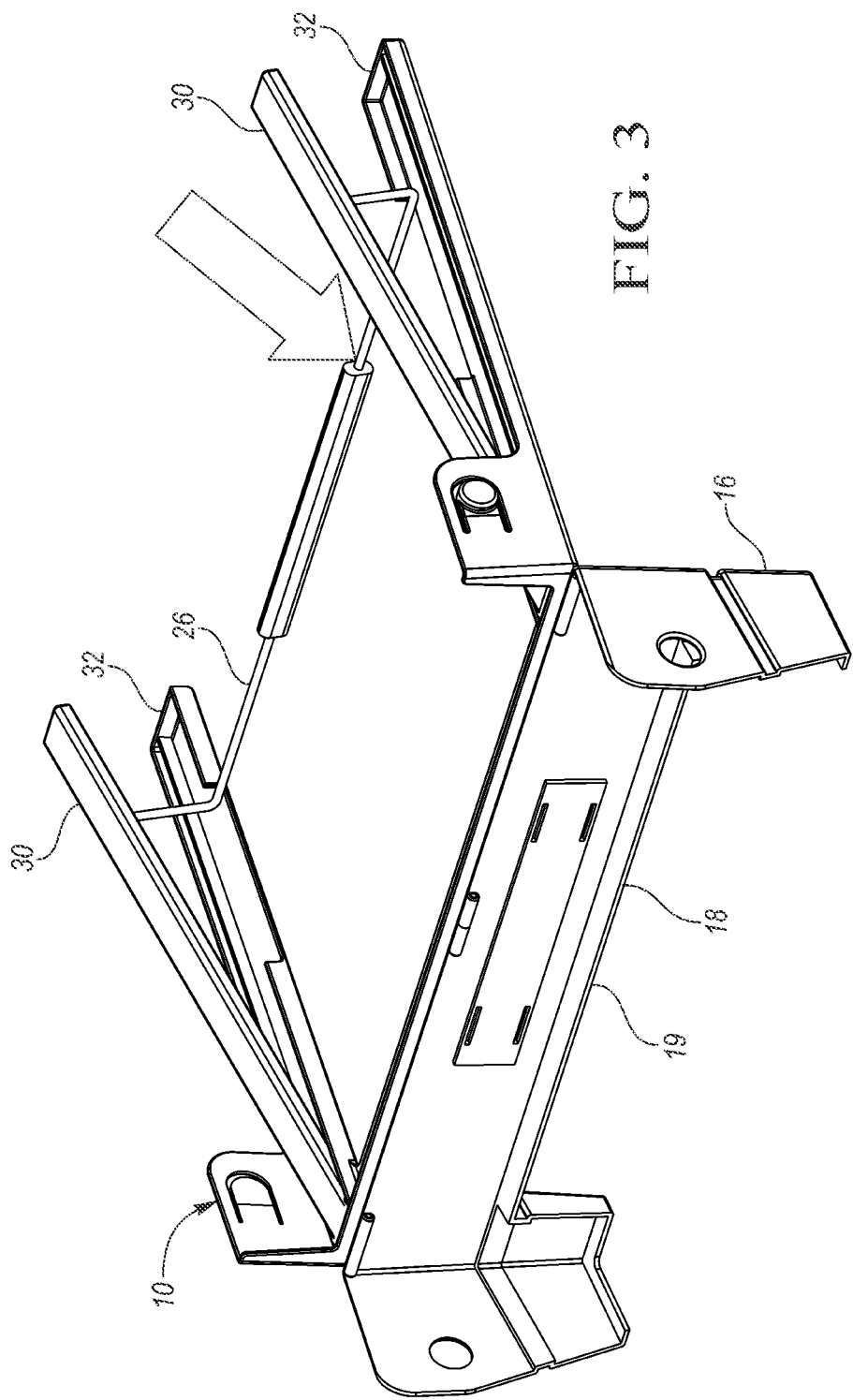
FIG. 3 shows the tray support device of FIG. 2 with the support members in the deployed position.

As shown in FIG. 3, by activating (e.g. sliding) the prop bar 26 rearward, the U-shaped prop bar 26 rotates, thus propping up the support member 30 on each side of the tray support 10. The prop bar 26 includes a pair of arms extending transversely from a cross-bar to form the U-shape. The arms are pivotably mounted at outer ends to the support members 30 on each side of the tray support 10. The prop bar 26 is slidably received in channels on the base arms 32. When the prop bar 26 is activated, the support members 30 are angled downward toward the front of the tray support 10 and the shelf 12. The support members 30 are pivotably connected at forward ends to forward ends of the base arms 32. Each component of the tray support 10 maybe injection molded plastic, although the prop bar 26 is preferably metal. The front face 16 may be connected to the base 13 via a hinge, such as a living hinge or complementary hinge components formed on the front face 16 and base 13.

As shown in FIG. 4, a bakery tray 100 or other tray can then be slid onto the tray support 10. In particular, the bakery tray 100 is slid onto the support members 30. In practice, the tray 100 would be loaded with goods or items for sale, as shipped in the tray 100 from a bakery, warehouse or distribution center. The bakery tray 100 may be integrally molded as a single piece of suitable plastic. The bakery tray 100 may have a base 112, front and rear walls 114 and opposed side walls 116. The front and rear walls 114 may be shorter, at least in portions, than the side walls 116. Bakery trays 100 of this general type are well known.

As shown in FIG. 5, the front face 16 is then pivoted upward to the closed position and snaps into place securely. The front of the tray 100 is retained securely by the front face 16 and between the side flanges 20. The front ledge 19 of the front face 16 overlaps the upper edge of the front wall 114. In this position, a tray 100 loaded with items or goods for sale (e.g. bread, buns or other baked items—not shown) can be supported on the support members 30 in their "up" position, such that the tray 100 is tilted forward for increased viewability of the contents of the tray 100 and improved access to the goods. Customers of the store can view and retrieve the goods for sale directly from the tray 100 on the shelf 12.

As desired, the tray 100 can also be placed on the tray support 10 when the support members 30 are in the down position, i.e. generally horizontal. The front face 16 still provides a more aesthetically pleasing appearance which could have advertising, logos or information about the goods for sale in the tray 100. Thus, the tray support 10 provides two positions for supporting a tray 100 thereon.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A tray support device and bakery tray in combination, the combination comprising:
    a tray support device including a base, wherein the base of the tray support device is supportable on a shelf, wherein the base includes base flanges extending upward;
    the tray support device further including a front face extending upward from a front edge of the base, side flanges extending rearward from side edges of the front face, the side flanges formed integrally with the front face, wherein the front face is hingeably connected to the base so that the front face is pivotable from an upright position to a retracted position, wherein the base flanges are selectively securable to the side flanges of the front face;
    the tray support device further including at least one support member pivotably connected to the base and movable from a collapsed position on the base to a deployed position spaced above the base;
    the tray support device further including at least one prop selectively positionable relative to the base and the at least one support member to move the at least one support member between the collapsed position and the deployed position; and
    a bakery tray received in the tray support device, the bakery tray supported on the at least one support member and abutting the front face.

2. The tray support device and bakery tray of claim 1 wherein the at least one support member is pivotable relative to the base between a retracted position on the base and a deployed position.

3. A tray support device and bakery tray in combination, the combination comprising:
    a tray support device including a base including a front base portion and a pair of base arms extending rearwardly from the front base portion, wherein the base of the tray support device is supportable on a shelf;
    the tray support device further including a front face pivotably connected to the front base portion and movable between an upright position and a retracted position;
    the tray support device further including a pair of support members pivotably connected to the base and each movable from a collapsed position on one of the base arms to a deployed position spaced above the respective base arm; and
    a bakery tray received in the tray support device, the bakery tray supported on the pair of support members and abutting the front face.

4. The tray support device and bakery tray of claim 3 further including side flanges extending rearward from side edges of the front face, the side flanges formed integrally with the front face.

5. The tray support device and bakery tray of claim 4 wherein the base includes base flanges extending upward and selectively securing to the side flanges of the front face.

6. The combination of claim 3 further in combination with a shelf, wherein the base of the tray support device is supported on a shelf.

7. The tray support device and bakery tray of claim 3 further including a prop selectively repositionable to move the pair of support members between the deployed position and the collapsed position.

8. A tray support device and tray comprising:
    a tray support device comprising a base, a front face extending upward from a front edge of the base, at least one support member movable from a collapsed position on the base to a deployed position spaced above the base, and at least one prop selectively positionable relative to the base and the at least one support member to move the at least one support member between the collapsed position and the deployed position; and
    a bakery tray received in the tray support device, the bakery tray supported on the at least one support member and abutting the front face.

9. The tray support device and tray of claim 8 further in combination with a shelf, wherein the base of the tray support device is supported on a shelf.

10. A tray support device and tray in combination comprising:
    a tray support device comprising a base including a front base portion and a pair of base arms extending rearwardly from the front base portion, a front face pivotably connected to the front base portion and movable between an upright position and a retracted position, and a pair of support members each movable from a collapsed position on one of the base arms to a deployed position spaced above the respective base arm; and
    a bakery tray received in the tray support device, the bakery tray supported on the pair of support members and abutting the front face.

11. The tray support device and tray of claim 10 further in combination with a shelf, wherein the base of the tray support device is supported on a shelf.

* * * * *